Nov. 17, 1959

I. R. LEWIS, JR., ET AL 2,913,018

APPARATUS FOR FILLING RECEPTACLES WITH
VOLUME-TRICALLY MEASURED QUANTITIES
OF PULVERANT MATERIAL

Filed March 1, 1957

INVENTORS
GEORGE JELLINEK
IRVING R. LEWIS JR
BY
Leo C. Krazinski
ATTORNEY

INVENTORS
GEORGE JELLINEK
IRVING R. LEWIS JR.
BY
Leo C. Krazinski
ATTORNEY

Nov. 17, 1959 I. R. LEWIS, JR., ET AL 2,913,018
APPARATUS FOR FILLING RECEPTACLES WITH
VOLUME-TRICALLY MEASURED QUANTITIES
OF PULVERANT MATERIAL
Filed March 1, 1957 5 Sheets-Sheet 3

INVENTORS
GEORGE JELLINEK
IRVING R. LEWIS JR
BY
Leo C. Krasinski
ATTORNEY

Nov. 17, 1959
I. R. LEWIS, JR., ET AL
2,913,018
APPARATUS FOR FILLING RECEPTACLES WITH
VOLUME-TRICALLY MEASURED QUANTITIES
OF PULVERANT MATERIAL
Filed March 1, 1957
5 Sheets-Sheet 4
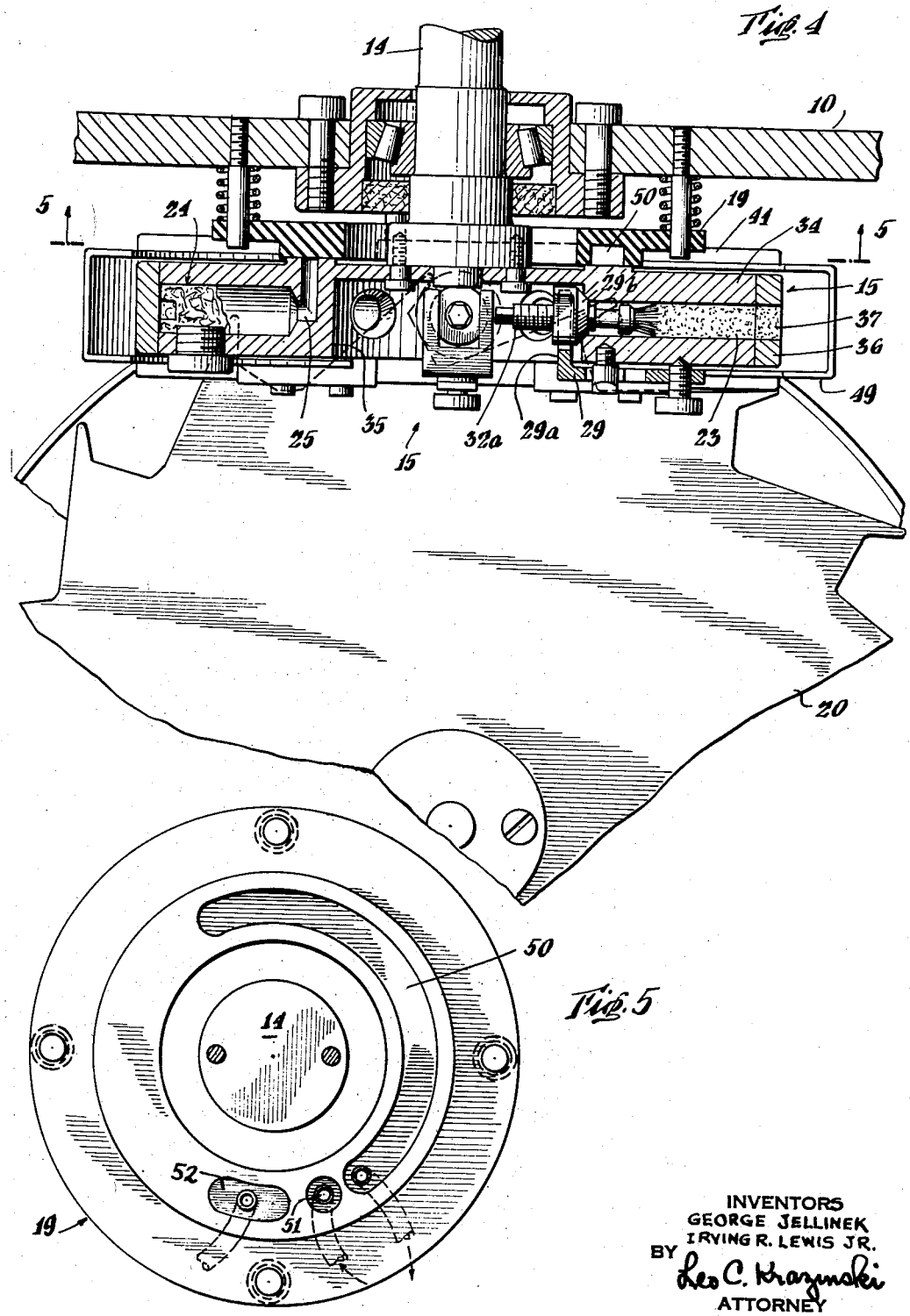
INVENTORS
GEORGE JELLINEK
IRVING R. LEWIS JR.
BY
Leo C. Krazynski
ATTORNEY Nov. 17, 1959   I. R. LEWIS, JR., ET AL   2,913,018
APPARATUS FOR FILLING RECEPTACLES WITH
VOLUME-TRICALLY MEASURED QUANTITIES
OF PULVERANT MATERIAL
Filed March 1, 1957                                        5 Sheets-Sheet 5
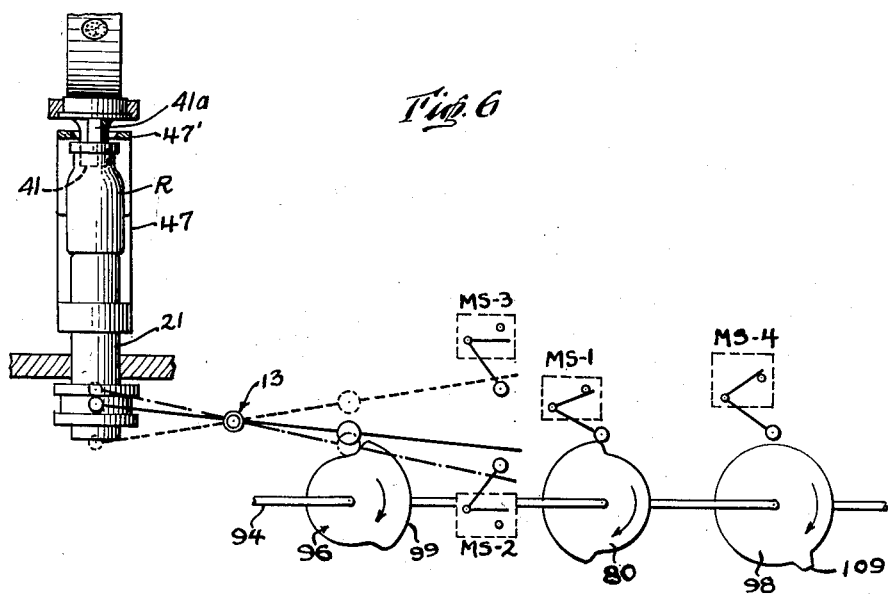
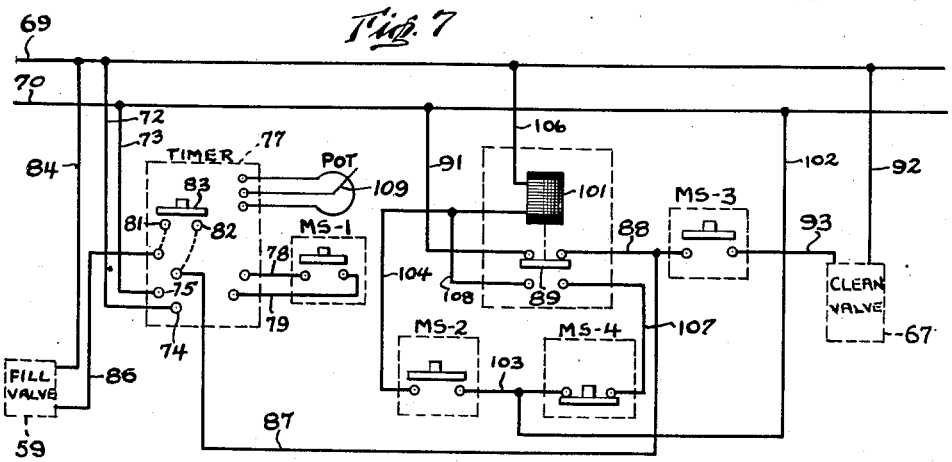
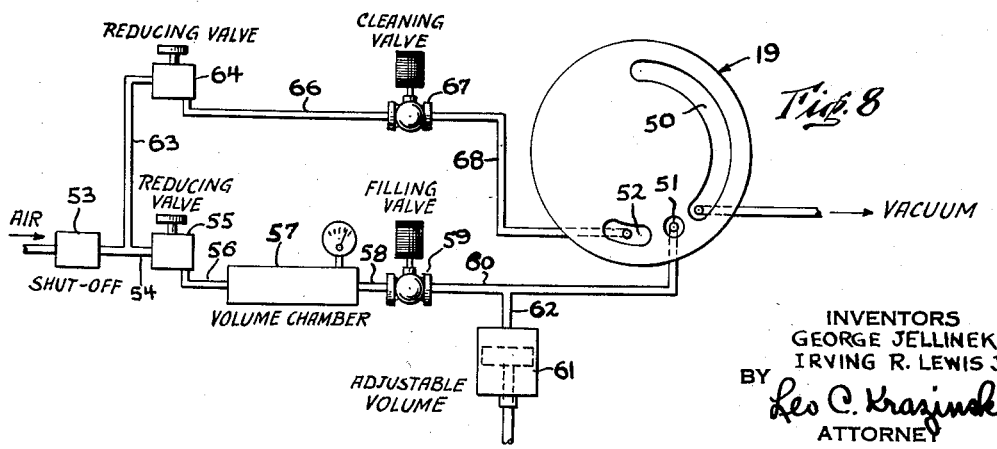
INVENTORS
GEORGE JELLINEK
IRVING R. LEWIS JR.
BY Leo C. Krazinski
ATTORNEY

United States Patent Office 2,913,018
Patented Nov. 17, 1959

2,913,018

APPARATUS FOR FILLING RECEPTACLES WITH VOLUMETRICALLY MEASURED QUANTITIES OF PULVERANT MATERIAL

Irving R. Lewis, Jr., Summit, and George Jellinek, Plainfield, N.J., assignors to Merck & Co., Inc., Rahway, N.J., a corporation of New Jersey Application March 1, 1957, Serial No. 643,464

15 Claims. (Cl. 141—91)

The present invention relates to apparatus for filling receptacles with volumetrically measured quantities of pulverant material and, more particularly, to improvements in such apparatus of the type illustrated in United States Patent No. 2,540,059.

Accordingly, an object of the present invention is to provide such apparatus which operates more rapidly than that heretofore employed.

Another object is to prevent the pulverant material from being deposited on the lip of the receptacle whereby grains of powder will not impair the effectiveness of the seal for the receptacle.

Another object is to prevent the pulverant material from being blown out of the receptacle as it is introduced therein under pressure.

Another object is to provide such apparatus which is easier and more economical to manufacture and assemble.

Another object is to clean the measuring cavities after a charge of material has been discharged therefrom to thereby prevent the accumulation of remnant material from each charge which tends to build up and cake and reduces the volumetric capacity of the cavities.

A further object is to insure that the quantity of material introduced into each receptacle be uniform.

A still further object is to prevent discharge of the pulverant material when no receptacle is presented for the filling operation.

Other and further objects will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawing, forming a part of the specification, wherein:

Fig. 4 is a sectional view taken along the line 4—4 on Fig. 3.

Fig. 5 is a sectional view taken substantially along the line 5—5 on Fig. 4 which illustrates the vacuumizing and the pressurizing means for the measuring cavities.

Fig. 6 is a schematic view of mechanism for controlling the bottle filling unit.

Fig. 7 is a schematic wiring diagram of the control mechanism shown in Fig. 6.

Fig. 8 is a schematic view of air valve mechanism and air volume regulating means associated with the bottle filling unit.

Figure 1:
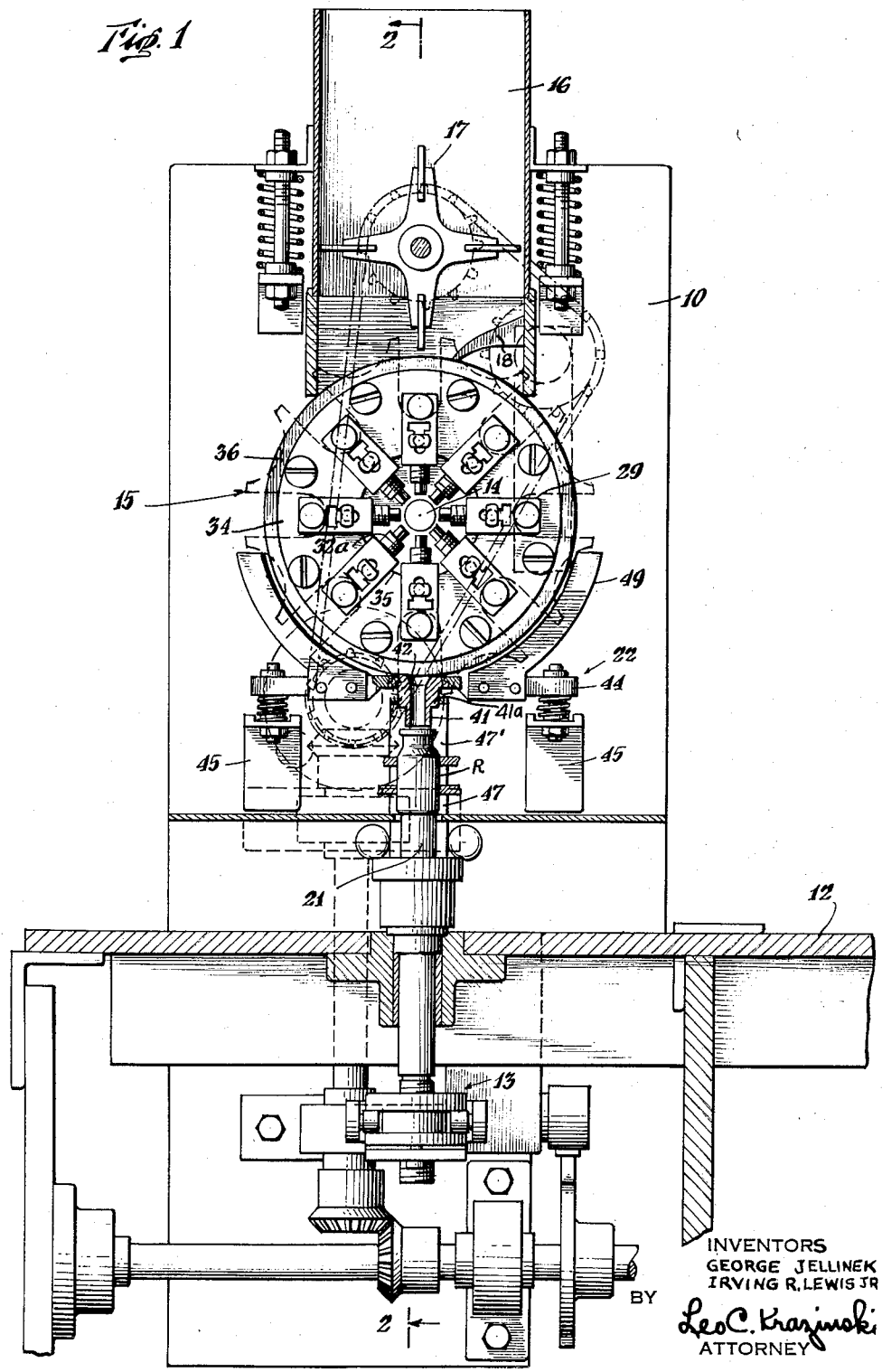
Fig. 1 is a front elevational view, partly in section, of apparatus in accordance with the present invention.
Figure 2:
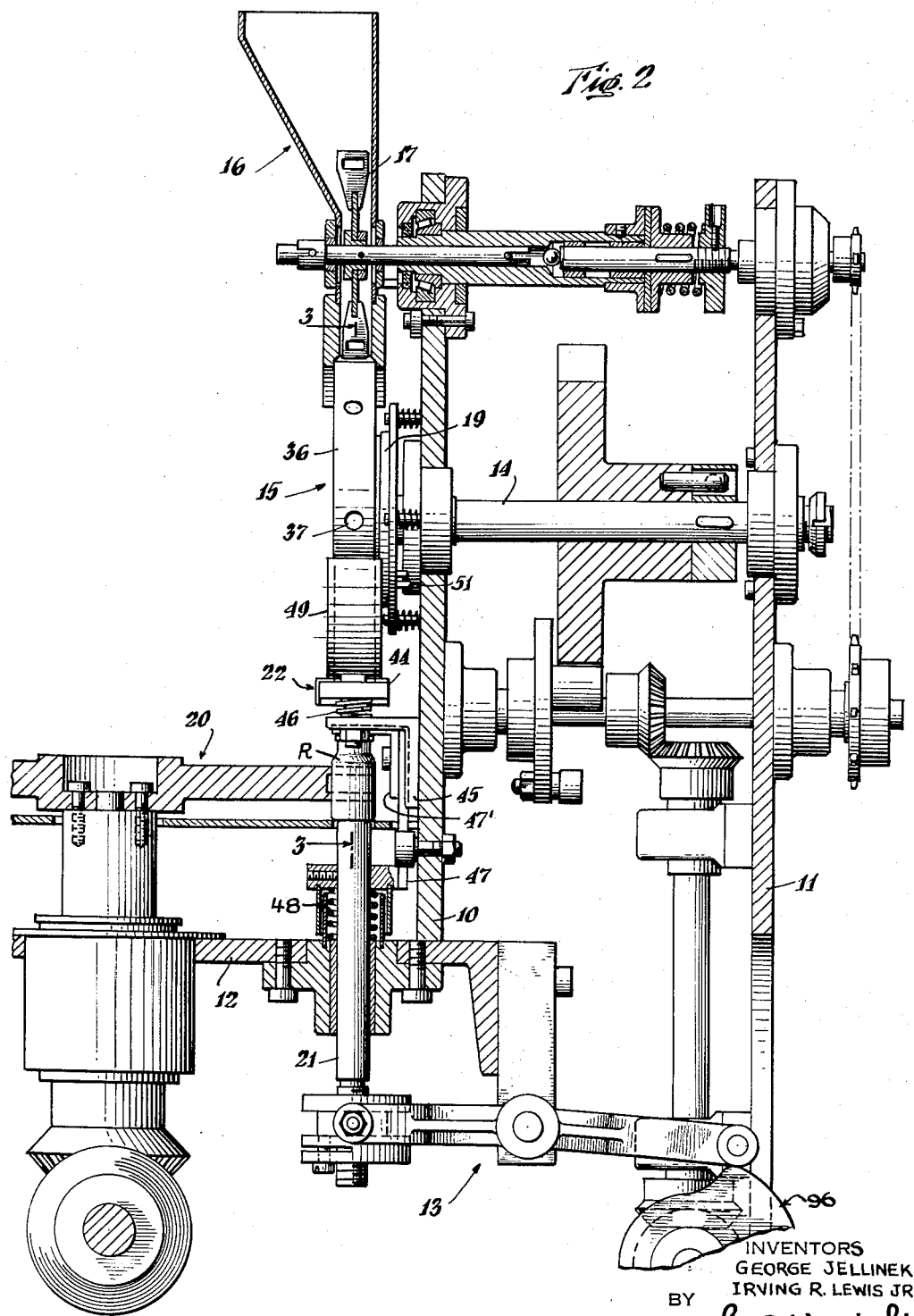
Fig. 2 is a sectional view taken along the line 2—2 on Fig. 1.

As shown in Figs. 1 and 2 of the drawings, the apparatus with which the present invention is concerned generally comprises upright front and back frame members 10 and 11, respectively, a platform 12 supported by the member 10 at the front thereof, a horizontal shaft 14 rotatably supported by the upright members, a drum 15 mounted for rotation with the shaft above the platform and formed with measuring cavities, as described hereinafter, a hopper 16 above the drum for delivering pulverant material to the measuring cavities, an agitator assembly 17 mounted for rotation within the hopper to agitate the material and a doctor blade 18 to wipe the periphery of the drum and remove excess material at the cavities, a stationary valve plate 19 between the drum and the frame member 10 arranged to vacuumize and pressurize the cavities, mechanism 20 mounted on the platform for presenting receptacles R to be filled beneath the drum including a plunger 21 arranged for elevating the receptacles to position the same under a filling head 22, and suitable, conventional drive means 13 for rotating the drum shaft 14 intermittently and the agitator assembly 17 continuously and for raising and lowering the plunger 21 in timed relation with respect to the movement of the drum 15.

Figure 3:
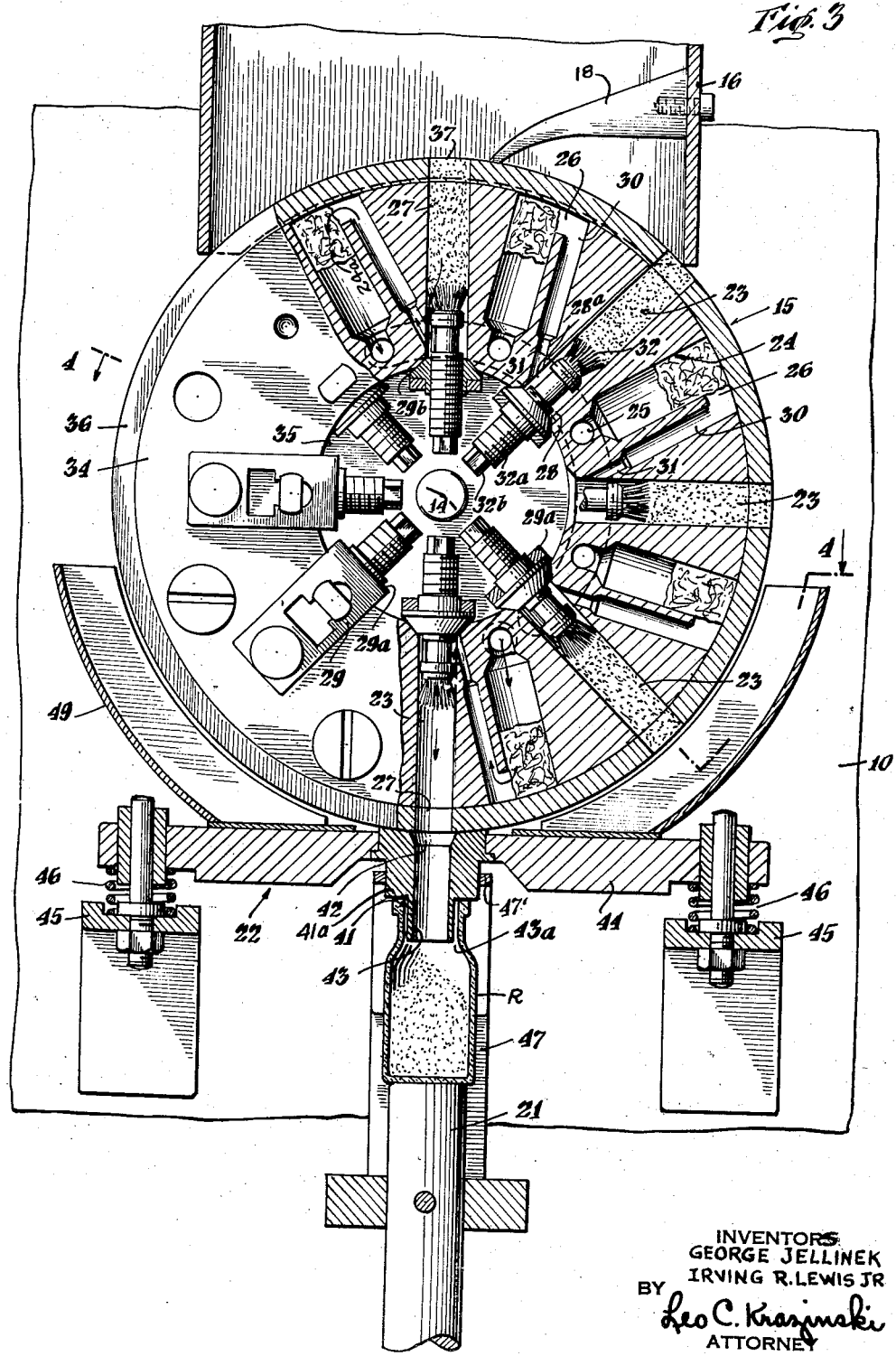
Fig. 3 is an enlarged sectional view taken substantially along the line 3—3 on Fig. 2.

In accordance with the present invention, the drum 15, as shown in Figs. 3 and 4, has a plurality of circumferentially spaced radial measuring cavities 23, herein shown as eight in number, and has a corresponding number of substantially radial chambers 24 each adjacent a cavity. Each of the chambers 24 has a port 25 at the inner end positioned to communicate with valve means of the plate 19 (Fig. 5), and has an opening 26 at the outer end thereof. Within each chamber 24 is disposed a filter 24a, consisting preferably of cotton, for preventing contaminated air from reaching the powder-receiving cavities 23. Each of the cavities 23 has an opening 27 at the outer end for receiving and discharging the pulverant material, an opening 28 at the inner end and an inlet 28a adjacent the inner end. A substantially radial passageway 30 formed with a reduced passageway 31 provides a flow connection between the chamber openings 26 and the cavity inlets 28a.

Porous means 32, such as disclosed in United States Patent No. 2,632,525, are disposed between the cavity openings 27 and 28 to confine pulverant material within the cavities 23 and thereby prevent contamination of passages upstream of the inlet of the cavities. The porous means are adjustable in a radial direction to accurately control the volumetric capacity of the cavities. This is accomplished in a simplified manner by securing brackets 29 to the outer face of the drum 15 which brackets have an offset portion 29a extending across the cavity openings 28 and across an apertured plug 29b that seals the cavity openings 28. The porous means 32 have stems 32a threaded into and extending through the plug 29b. The inner ends of the stems 32a are disposed in a central, circular recess 35 of the drum and are formed with bolt heads 32b adapted for engagement by a wrench or similar tool to rotate the stems and adjust the position of the porous means, so as to vary the volume of the measuring cavities 23.

A feature of the drum 15 is that it can be machined in an extremely simple and economical manner. This is accomplished by providing a circular inner drum member 34 with the central recess 35 at the front thereof and boring the cavities 23, the chambers 24 and the passageways 30 in a radial direction from the periphery of the drum member and boring the chamber ports from the back of the drum member. By positioning the passageways 30 at an angle to the cavities 23 the inner ends of the passageways enter adjacent the respective inner ends of the cavities. Portions of the drum member at the periphery are removed to establish the openings 26 between the chambers and passageways. An outer member or rim 36 is applied about the periphery of the drum member 34 to close the outer ends of the chamber and passageway bores, and preformed apertures 37 in the rim register with the outer ends of the cavities to provide in effect the openings 27. The porous means are adjustably mounted in the cavities without internal threading or resorting to sleeves or inserts.

As best shown in Fig. 3, the filling head 22 includes a funnel 41 having an arcuate upper section contoured to fit the periphery of the drum, a bore 42 positioned to register with the cavity openings 27, and a lower tubular skirt section 43 dimensioned to extend into the mouth of the receptacle R and provide an annular clearance 43a. The penetration of the skirt 43 within the receptacle R allows the pulverant material to enter below the neck constriction, ejecting the air via the annular clearance 43a, without creating a turbulent flow. The ejected air, after passing upwardly through the annular clearance 43a between the inside of the mouth of the receptacle R and the outside of the skirt 43 of funnel 41 (see Fig. 3), discharges into the atmosphere, as the lip of the receptacle R engages only two small downwardly depending shoulders 41a formed on the funnel 41 at opposite sides of the center line of the funnel. These shoulders 41a are shown in Figs. 1, 3 and 6, the view of these parts shown in Figs. 1 and 3 being at right angles to that shown in Fig. 6, and also being in section. This improved arrangement prevents particles of powder from being deposited on the lip of the receptacle R and impairing the seal subsequently provided for the receptacle R.

The funnel 41 is supported adjacent the drum 15 and is biased into engagement therewith by a horizontal bar 44, which is mounted at its ends on brackets 45 secured to the front frame member 10 and which is urged upwardly by resilient means, such as springs 46. A cage 47 is shown beneath the funnel 41 rigidly secured to the plunger 21 and between the cage 47 and platform 12 (Fig. 2) there is further shown resilient means 48 for urging the plunger 21 and cage upwardly during the receptacle filling operation. During this filling operation the resilient means 46 and 48 increase the effectiveness of the seal between the funnel 41 and the drum 15 and thereby prevent waste of pulverant material.

The cage 47 includes an upper bracket 47' having an opening in which the body portion of the funnel 41 is disposed, as seen in Fig. 3, which bracket is under control of the drive means 13 throught the plunger 22. As the drive means 13 retracts the plunger 21 downwardly, following discharge of the pulverant material into the receptacle R, the cage 47 and bracket 47' likewise retract downwardly with the bracket 47' guiding and lowering the filled receptacle R to the conveyor mechanism 20 by which it is withdrawn in conventional manner The bar 44 also serves as a support for a trough 49 which surrounds the lower portion of the drum and serves to retain very small amounts of pulverant material which may escape from the cavities or drop out of the porous means or the cavities after discharge. While such amounts of material for each measured charge are negligible and do not affect the accuracy of the apparatus, it will be appreciated that an appreciable amount of material would be accumulated from thousands of charges and would contaminate the apparatus.

The valve plate 19 is shown in Figs. 4 and 5 and includes a 180° recess 50 connected to a source of suction, a filling port 51 and a cleaning recess 52, both connected to a source of air under pressure. The chamber ports 25 register with the recess 50, the port 51, and the recess 52 sequentially during the rotation of the drum in the manner about to be described.

In operation of the apparatus, a receptacle R is presented and raised to the funnel just after the measuring cavity opening 27 registers with the funnel bore 42. The cavities 23 are charged when the chamber ports 25 move into registry with the forward end of the recess 50, whereby suction is applied in the manner previously described and pulverant material is drawn into the cavities 23. The same quantity of material is charged into each cavity to provide uniformly, accurately filled receptacles. Suction is maintained through recess 50 at full effect until the cavities 23 approach the funnel 41.

As the chamber port 25 leaves the tail end of the recess 50, it is brought into registry with the filling port 51 just as the cavity opening 27 registers with the funnel 41 (see Fig. 3). At this point, the drum dwells and the pressurized air, emitted through filling port 51 passes through chamber port 25 into chamber 24, where the air is filtered. It then passes through opening 26, passageways 30 and 31, openings 28a and 28, and thence through porous means 32 to cavity 23 to discharge the pulverant material into the receptacle R. As rotation of the drum is resumed, the chamber port 25 (Figs. 4 and 5) is carried away from the filling port 51 and over cleaning recess 52 where pressurized air is again sent through port 25 and cavity 23 to clean the porous means 32 and the walls of the cavities to remove all residual particles therefrom. While the amount of residual particles so removed by the after blow is infinitesimal for each charge, accumulations thereof during prolonged operation of the apparatus tend to cake and reduce the capacity of the cavities, whereby the charge delivered to the receptacle R will be less than that required. This difficulty is thus eliminated and the cavities are completely empty when moved under the hopper 16 for placing a succeeding charge therein.

The flow of pressurized air in the foregoing operations is shown schematically in Fig. 8. During the receptacle filling operation the pressurized air is supplied by a compressor (not shown) and is passed through a shut-off valve 53, conduit 54, reducing valve 55, conduit 56, fixed volume chamber 57, conduit 58, solenoid control valve 59, and thence via conduit 60 to filling port 51. An adjustable volume chamber 61 is bridged to conduit 60 by a conduit 62. The fixed volume chamber 57 is provided to store pressurized air, regulated by means of reducing valve 55. Volume chamber 61 is installed to provide a cushion for the flow of pressurized air into cavities 23, being adjusted according to the type of pulverant material being dispensed. Particularly in the case of powdery charges, a gradual change of pressure is desirable and this is readily obtained through adjustment of the chamber 61.

During the cleaning operation, that is, when the port 25 is passing over the recess 52, the pressurized air follows a path through the shut-off valve 53, along conduit 63, reducing valve 64, conduit 66, cleaning valve 67, conduit 68, and thence through recess 52, port 25 (Fig. 3), chamber 24, opening 26, passageways 30 and 31, openings 28a and 28, and finally past the porous means 32 through the cavity 23 and opening 27, where any residual particles of material are deposited into the trough 49.

The electrical circuit (see Fig. 7) for controlling operation of the filling and cleaning valves 59 and 67, respectively, will now be described. Supply means of the desired voltage and power are provided by leads 69 and 70 and these leads are multipled by leads 72 and 73, respectively, to power supply contacts 74 and 75, respectively, of an electronic timer 77. The timer 77 is energized by a micro-switch MS–1, the closing of which will be described hereinafter, through leads 78 and 79. The electronic timer 77 is provided to enable the operator to vary the length of time the filling valve 59 remains open, independent of the micro-switch MS–1, which is controlled by a blow cam 80 and, therefore, by the speed of the machine. It is important to stop the flow of pressurized air as soon as all pulverant material has been discharged into the receptacle R, as further flow of air will tend to force the pulverant material out of the receptacle, depositing some on the lip. The timer, being finely adjustable by moving the arm 109 of the potentiometer POT, makes it possible to set the time of blow to the shortest length for complete discharge. During the filling operation micro-switch MS-1 having operated and the timer 77 having been energized, contacts 81 and 82 are closed by switch 83 to energize the solenoid of the filling valve 59 in a circuit that can be traced from supply lead 69 through lead 84, solenoid winding of filling valve 59, lead 86, contact 81, closed switch 83, contact 82, lead 87, lead 88, and through closed switch 89 and lead 91 to the other lead 70 of the supply main. Energization of the solenoid winding opens the filling valve 59 and permits the pressurized air to pass through the port 51, as described hereinbefore. The timer switch 83 is opened after the predetermined period, as determined by the setting of the potentiometer arm 109, to release the filling valve solenoid and thereby close the same to prevent further discharge of pressurized air to the port 51. The duration of the blow for discharging the pulverant material from the measuring cavity 27 into the receptacle R can thus be readily and easily shortened or lengthened by adjusting the arm 109 of the potentiometer POT without stopping the apparatus and without adjusting or replacing any cams of the apparatus, and without changing the speed at which the apparatus is operated. Consequently, the operator of the apparatus is readily able to adjust the length of this blow, while the apparatus is in operation and while the effect of the adjustment is immediately apparent, so that the length of the blow is of sufficient duration to effect the desired discharge of the material into the receptacle R, but of insufficient duration to force any of the material in the receptacle out of the receptacle. The latter condition, when it occurs, not only causes the contents of the receptacle to be underweight, but also causes dust to deposit on the lip of the receptacle, which impairs the effectiveness of the seal subsequently provided for the receptacle R.

During the cleaning operation, a micro-switch MS-3 is closed, as will be described hereinafter, and a circuit for operating the solenoid of the cleaning valve 67 may be traced from supply lead 69 along lead 92 through the solenoid winding of the cleaning valve 67, lead 93, closed micro-switch MS-3, conductor 88, closed switch 89 (in upper position), and thence over conductor 91 to the other supply lead 70. The cleaning valve 67 remains open only during the period of closure of the micro-switch MS-3 and upon opening of said latter switch, the above traced circuit is interrupted to release the solenoid and close the associated valve 67.

The operation of the micro-switches and cam movements, shown in Fig. 6, during the filling and cleaning operations will now be described. In schematic form there is shown a cam shaft 94 upon which are fixedly mounted a lifting cam 96, the blow cam 80 and a reset cam 98. The drive means 13 actuating the plunger 21 and cage 47 are also shown schematically. Turning first to the filling operation, it will be noted that the blow cam 80 has actuated the micro-switch MS-1 to close the same and that the receptacle R is raised to the filling position. It is stopped in its upward travel by the shoulders 41a of funnel 41 (Figs. 3 and 6), which causes drive means 13 to leave the lifting cam 96, as shown in solid lines in Fig. 6. The receptacle R remains in the upward, filling position until the raised segment 99 of the lifting cam 96 actuates the drive means 13 to permit the receptacle to be brought down by the cage 47 and upper bracket 47'.

During the cleaning operation the receptacle R is in the lowered position and the right side of the drive means 13, as viewed in Fig. 6, is shown in an upward position (dotted) to actuate the micro-switch MS-3. The flow of pressurized air during the cleaning period remains only for a predetermined time in accordance with the time that the port 25 is travelling along the recess 52. The closure of micro-switch MS-3 may extend beyond the required time for the cleaning operation, but flow of pressurized air is stopped by the surface of the valve plate 19 sealing the port 25 (see Fig. 4).

In the event that a receptacle is not presented for the filling operation, the charge of pulverant material in cavity 23 must not be dispensed. This is accomplished by the fact that the cage 47 and bracket 47' will be raised higher than normal, since a receptacle is not seated upon plunger 21, so that the right end of the drive means 13 will, following lifting cam 96, be lowered to the lowermost position (dot-dash) in Fig. 6 to actuate and close the micro-switch MS-2. At this time micro-switch MS-4 is also closed. Therefore, as seen in Fig. 7, an energizing circuit for relay 101 may be traced from supply lead 70 via leads 102 and 103, through closed micro-switch MS-2, lead 104, and thence through winding of relay 101 and lead 106 to the other supply lead 69. Relay 101 operates and closes a holding circuit therefor, which may be traced via supply lead 70, lead 102, lead 103, closed micro-switch MS-4, lead 107, closed switch 89 (in lower position), lead 108, and thence via lead 104, winding of relay 101 and lead 106 to the other lead 69 of the supply main. Although the micro-switch MS-1 is subsequently energized, the circuit for the filling valve 59 remains open, since the relay 101 has moved its switch contact 89 from the upper terminals to the lower terminals thereof. Further, since the filling valve remains closed, discharge of the pulverant material does not occur.

If cavity 23 has not been discharged into a receptacle, it obviously should not subsequently be cleaned. Therefore, the cleaning valve 67 must remain closed during this cycle. This is accomplished in the following manner. As shown previously, if no receptacle has been presented, the relay 101 becomes energized and switch 89 moves to the lower position in Fig. 7. Consequently, when micro-switch MS-3 is closed by drive means 13, the circuit for the solenoid of cleaning valve 67 through leads 91 and 88 remains open.

Finally, before the lifting cam 96 allows drive means 13 to raise the next receptacle R into filling position, protuberance 109 on reset cam 98 reaches and opens micro-switch MS-4, which in turn open the above traced holding circuit for relay 101 and thereby returns the mechanism to its starting position.

From the foregoing description, it will be seen that the present invention provides improved apparatus of the type described which eliminates the difficulties heretofore encountered and enables the drum to be rotated at speeds to fill as many as about 50,000 receptacles in about seven hours. This is at the rate of about one hundred and twenty (120) receptacles per minute or two (2) receptacles per second.

As various changes may be made in the form, construction, and arrangement of the parts herein, without departing from the spirit and scope of the invention and without sacrificing any of its advantages, it is to be understood that all matters are to be interpreted as illustrative and not in any limiting sense.

What is claimed is:

1. In apparatus for filling a receptacle, the combination of means at which a receptacle is to be filled, means for supplying a pulverant material, a member formed with a measuring cavity having an opening at one end thereof, means for moving said member from one position to another to place said opening in communication with said material supplying means and the receptacle, means for vacuumizing said cavity while moving the opening thereof from said material supplying means where the cavity is filled to the receptacle and for pressurizing the filled cavity when the opening thereof is in communication with the receptacle, chamber means having a greater volumetric capacity than said cavity between said last mentioned means and said cavity, said chamber means and said cavity being radially disposed in said member and circumferentially spaced with respect to each other, a passageway serially interconnecting said chamber means and said cavity, and means between said cavity and said chamber means for confining the material in said cavity.

2. Apparatus according to claim 1, wherein said means at which the receptacle is to be filled include funnel means having an upper end opening adapted to register with said cavity opening and having a lower tubular section adapted to extend into the mouth of the receptacle, and resilient means are provided for urging said upper end opening of said funnel means continually against said member.

3. Apparatus according to claim 2, wherein said tubular section is dimensioned to provide a clearance between it and side walls of the mouth of the receptacle to enable air within the receptacle to escape while the receptacle is being filled.

4. Apparatus according to claim 2, including resilient means for further urging said funnel means into engagement with said member when the receptacle is being filled so as to provide a tight pulverant material seal.

5. In apparatus for filling a receptacle, the combination of means for supplying a pulverant material; a drum mounted for rotation beneath said supplying means and having a plurality of substantially radial measuring cavities formed with an opening at the outer end thereof for receiving the material from said supplying means and delivering the same to a receptacle and having a plurality of substantially radial chambers each of which is adjacent one of said cavities and is circumferentially spaced therefrom and is in flow communication therewith; passageway means serially interconnecting said chamber means and said measuring cavity, means for vacuumizing and pressurizing said chambers and cavities; and means between each cavity and its chamber for confining the material in said cavity.

6. Apparatus according to claim 5, wherein said drum includes a circular drum member and said cavities, said chambers and said passageway means are substantially radial bores extending inwardly from the periphery of said drum member, and a rim surrounds and rotates with said drum member to close the outer ends of said chambers and said passageway means and is formed with apertures in registry with said cavity openings.

7. Apparatus for filling a receptacle comprising, in combination, means for supplying a pulverant material, a drum formed with a measuring cavity having an opening at one end thereof, means for moving said drum from one position to another to place said opening in communication with said material supplying means and the receptacle, means for vacuumizing said cavity while moving the opening thereof from said material supplying means where the cavity is filled to the receptacle and for pressurizing the filled cavity when the opening thereof is in communication with the receptacle, means normally biased into engagement with said drum and disposed beneath said drum for funneling the material from said cavities into the receptacles, said funneling means including a skirt adapted to extend into a mouth of the receptacle during a filling operation, means for raising one of said receptacles into a filling position whereby an upper edge of said one receptacle abuts said funneling means, means for lowering said receptacle following the filling operation, and means for controlling said raising and lowering means.

8. Apparatus according to claim 7, including electromechanical means for timing the period at which the pressurizing means is effective to charge the receptacle with pulverant material.

9. Apparatus according to claim 8, wherein said timing means include a cam mechanism, an electric switch and an electrical timer, operation of said timer being controlled by said electric switch which latter is in turn controlled by said cam mechanism.

10. Apparatus according to claim 9, including relay means for rendering ineffective said electrical timer and in turn withholding said pressurizing means from said filled cavity when a receptacle has not been presented to be filled by the raising means.

11. Apparatus according to claim 7, wherein said control means include a cam having a protuberance and drive means interconnecting said cam and said raising and lowering means, said drive means being actuated by said protuberance to in turn actuate said lowering means to lower said receptacle, and said raising means including resilient means for raising the receptacle when said protuberance is out of contact with said drive means.

12. Apparatus according to claim 7, wherein said lowering means include a movable cage for embracingly engaging said receptacle.

13. Apparatus according to claim 7, including a valve plate having a recess in communication with said pressurizing means and blow means for rendering effective said pressurizing means to clean out said cavity after said receptacle has been filled and lowered from the funneling means.

14. Apparatus according to claim 13, wherein said blow means include a blow cam and a solenoid controlled cleaning valve actuated by said cam when said cavity opening in said drum passes over said recess in said valve plate.

15. Apparatus according to claim 14, including relay means for rendering ineffective said solenoid controlled cleaning valve when a receptacle has not been presented to be filled and a charge of the pulverant material remains in the measuring cavity.

References Cited in the file of this patent

UNITED STATES PATENTS

| | | |
|---|---|---|
| 803,082 | Waterman | Oct. 31, 1905 |
| 1,233,261 | Munn | July 10, 1917 |
| 1,859,562 | Huston | May 24, 1932 |
| 1,900,458 | Morrow | Mar. 7, 1933 |
| 2,399,472 | De La Roza | Apr. 30, 1946 |
| 2,415,109 | Nordquist | Feb. 4, 1947 |
| 2,443,182 | Carter | June 15, 1948 |
| 2,540,059 | Stirn et al. | Jan. 30, 1951 |
| 2,642,216 | Carter | June 16, 1953 |
| 2,760,703 | Lyon | Aug. 28, 1956 |
| 2,783,787 | Day et al. | Mar. 5, 1956 |